(12) United States Patent
Ikeda et al.

(10) Patent No.: US 11,204,081 B2
(45) Date of Patent: Dec. 21, 2021

(54) SCREW SHAFT, FEED SCREW MECHANISM, AND ELECTRIC ACTUATOR

(71) Applicant: NTN Corporation, Osaka (JP)

(72) Inventors: Yoshinori Ikeda, Shizuoka (JP); Tatsunori Shimizu, Shizuoka (JP); Shinsuke Hirano, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/967,276

(22) PCT Filed: Feb. 26, 2019

(86) PCT No.: PCT/JP2019/007377
§ 371 (c)(1),
(2) Date: Aug. 4, 2020

(87) PCT Pub. No.: WO2019/167964
PCT Pub. Date: Sep. 6, 2019

(65) Prior Publication Data
US 2021/0095746 A1 Apr. 1, 2021

(30) Foreign Application Priority Data

Feb. 27, 2018 (JP) .............................. JP2018-033201

(51) Int. Cl.
*F16H 25/24* (2006.01)
*F16H 25/20* (2006.01)
*F16H 25/22* (2006.01)

(52) U.S. Cl.
CPC ..... *F16H 25/2015* (2013.01); *F16H 25/2204* (2013.01); *F16H 25/24* (2013.01)

(58) Field of Classification Search
CPC .. F16H 25/2015; F16H 25/2204; F16H 25/24; F16H 25/2454; H02K 7/06; G01D 5/245
See application file for complete search history.

(56) References Cited

U.S. PATENT DOCUMENTS 4,398,109 A * 8/1983 Kuwako ............. F16H 25/2015
310/80
5,704,250 A * 1/1998 Black ..................... B23Q 5/408
318/48

(Continued)

FOREIGN PATENT DOCUMENTS

JP 51-21053 2/1976
JP 2012-200822 10/2012

(Continued)

OTHER PUBLICATIONS

International Preliminary Report on Patentability and Written Opinion of the International Searching Authority dated Aug. 27, 2020 in International (PCT) Patent Application No. PCT/JP2019/007377.

(Continued)

*Primary Examiner* — David M Fenstermacher
(74) *Attorney, Agent, or Firm* — Wenderoth, Lind & Ponack, L.L.P.

(57) ABSTRACT

A screw shaft 22 constitutes a feed screw mechanism provided in an electric actuator. In the screw shaft 22 on which a mounting surface 22c for mounting a sensor target is formed, a portion where the mounting surface 22c is formed has a non-circular, line-symmetric cross section.

6 Claims, 11 Drawing Sheets

(56) References Cited

U.S. PATENT DOCUMENTS

| | | | | |
|---|---|---|---|---|
| 7,930,949 B2* | 4/2011 | Singh | ................... | F16H 57/01 |
| | | | | 74/89.23 |
| 8,791,663 B2* | 7/2014 | Pettey | ................. | F16H 25/2015 |
| | | | | 318/652 |
| 9,841,089 B2* | 12/2017 | Yamakura | ............. | F16C 29/082 |
| 10,612,632 B2* | 4/2020 | Lin | ..................... | F16H 25/2214 |
| 10,683,921 B2* | 6/2020 | Gnebner | ................. | F16H 48/34 |
| 10,837,575 B2* | 11/2020 | Heaney | ................... | F16K 31/08 |
| 2014/0353071 A1 | 12/2014 | Ando et al. | | |
| 2016/0116304 A1* | 4/2016 | Iwamoto | ................ | G01D 5/145 |
| | | | | 324/207.25 |
| 2017/0062988 A1 | 3/2017 | Sugita et al. | | |
| 2019/0078671 A1* | 3/2019 | Matsuto | ................... | F16H 25/24 |
| 2019/0093750 A1* | 3/2019 | Matsuto | ................ | F16H 57/021 |
| 2020/0240495 A1* | 7/2020 | Layne | ...................... | H02K 7/06 |
| 2020/0292039 A1* | 9/2020 | Matsuto | ................... | H02K 7/06 |
| 2021/0095746 A1* | 4/2021 | Ikeda | ...................... | F16H 25/20 |

FOREIGN PATENT DOCUMENTS

| | | |
|---|---|---|
| JP | 2014-105810 | 6/2014 |
| JP | 2016-20162 | 2/2016 |
| JP | 2017-45094 | 3/2017 |
| JP | 2017-180681 | 10/2017 |
| JP | 2017-184482 | 10/2017 |

OTHER PUBLICATIONS

International Search Report dated May 7, 2019 in International (PCT) Application No. PCT/JP2019/007377.

The Extended European Search Report dated Oct. 4, 2021 in counterpart European Patent Application 19761296.3.

* cited by examiner

SCREW SHAFT, FEED SCREW MECHANISM, AND ELECTRIC ACTUATOR

TECHNICAL FIELD

The present invention relates to a screw shaft that constitutes a feed screw mechanism, a feed screw mechanism, and an electric actuator.

BACKGROUND ART

As an electric actuator used for an automatic transmission mechanism, a brake mechanism, a steering mechanism, and the like of an automobile, an actuator using a feed screw mechanism that converts rotary motion of an electric motor into linear motion is known.

In this type of electric actuator, it is important to control a movement amount (an axial position) of a movable part that performs linear motion. Therefore, for example, in Patent Literature 1 below, an electric actuator in which a permanent magnet as a sensor target is attached to a screw shaft of a ball screw mechanism, and a magnetic field of the permanent magnet that changes with axial movement of the screw shaft is detected by a magnetic sensor, thereby acquiring an axial movement amount (position) of the screw shaft has been proposed.

CITATIONS LIST

Patent Literature 1: JP 2017-180681 A

SUMMARY OF INVENTION

Technical Problem

In the electric actuator described in Patent Literature 1, a cut-away part is formed on an outer peripheral surface of the screw shaft in order to attach the permanent magnet to the screw shaft.

However, when the outer peripheral surface of the screw shaft is subjected to cutting processing in forming the cut-away part, as shown in FIG. 12, a warp in which an axis O of a screw shaft 100 is bent to a cut-away part 100*a* side occurs due to cutting resistance or heat during the processing. In particular, the occurrence of such a warp tends to be noticeable because, in a case where an axial movement distance of the screw shaft is long, the permanent magnet needs to be arranged long in an axial direction, that is, the cut-away part needs to be formed long in the axial direction. Moreover, when the screw shaft is warped, in a case where a mating member to be operated is connected to a tip of the screw shaft, the screw shaft is constrained at this connection position, and a screw groove side opposite to the tip of the screw shaft is tilted. As a result, misalignment occurs between the screw shaft and a nut, which may lead to a malfunction, reduction in operation efficiency, and reduction in a service life of a feed screw mechanism. Therefore, improvement is desired.

Therefore, an object of the present invention is to provide a screw shaft capable of suppressing occurrence of a warp, a feed screw mechanism including such a screw shaft, and an electric actuator.

Solutions to Problem

In order to solve the above problems, the present invention is a screw shaft that constitutes a feed screw mechanism provided in an electric actuator, the screw shaft having a mounting surface for mounting a sensor target, wherein a portion where the mounting surface is formed has a non-circular, line-symmetric cross section.

In this way, by making the portion where the mounting surface is formed into the non-circular, line-symmetric cross section, even if a warp occurs due to cutting resistance or heat when the mounting surface is formed, the warp will occur to the same extent on one side and another side of the line-symmetric cross section of the screw shaft. In addition, since the warps that occur on the one side and the other side occur in directions opposite to each other, these warps are offset, and a warp that finally occurs on the screw shaft can be suppressed.

Alternatively, two flat surfaces may be formed so as to be line-symmetric with respect to an axis of the screw shaft, and one of the two flat surfaces may be the mounting surface. Furthermore, by allowing the mounting surface to be arbitrarily selectable from the two flat surfaces, a degree of freedom (flexibility) in mounting the sensor target is improved.

Further, the mounting surface may be a surface on which a target holder that holds the sensor target is mounted. In this case, by providing a protrusion or a recess for preventing erroneous assembly of the target holder with respect to the mounting surface at axial one end of the mounting surface, the sensor target can be correctly mounted and reliability is improved.

Further, at least the portion where the mounting surface is formed of the screw shaft may be heat-treated. Since a cross-sectional shape of the screw shaft is line-symmetric, it is possible to suppress occurrence of a warp due to the heat treatment. In other words, since the cross-sectional shape is line-symmetric, an amount of shrinkage of the screw shaft due to the heat treatment becomes uniform, so that occurrence of a warp due to a difference in amount of shrinkage can be suppressed. This makes it possible to provide a screw shaft having high shaft linearity (straightness) while securing necessary strength.

Further, the screw shaft according to the present invention can be applied to a feed screw mechanism provided in an electric actuator including: a rotatable nut; and a screw shaft that moves in an axial direction with rotation of the nut.

Furthermore, the screw shaft according to the present invention is also applicable to an electric actuator including: an electric motor; and a feed screw mechanism that converts rotary motion of the electric motor into linear motion.

Advantageous Effects of Invention

According to the present invention, since a warp of a screw shaft can be suppressed, a malfunction, reduction in operation efficiency, and further, reduction in a service life of a feed screw mechanism resulting from the warp of the screw shaft can be avoided. A highly reliable feed screw mechanism and an electric actuator including the same can be provided.

DESCRIPTION OF EMBODIMENT

Figure 1:
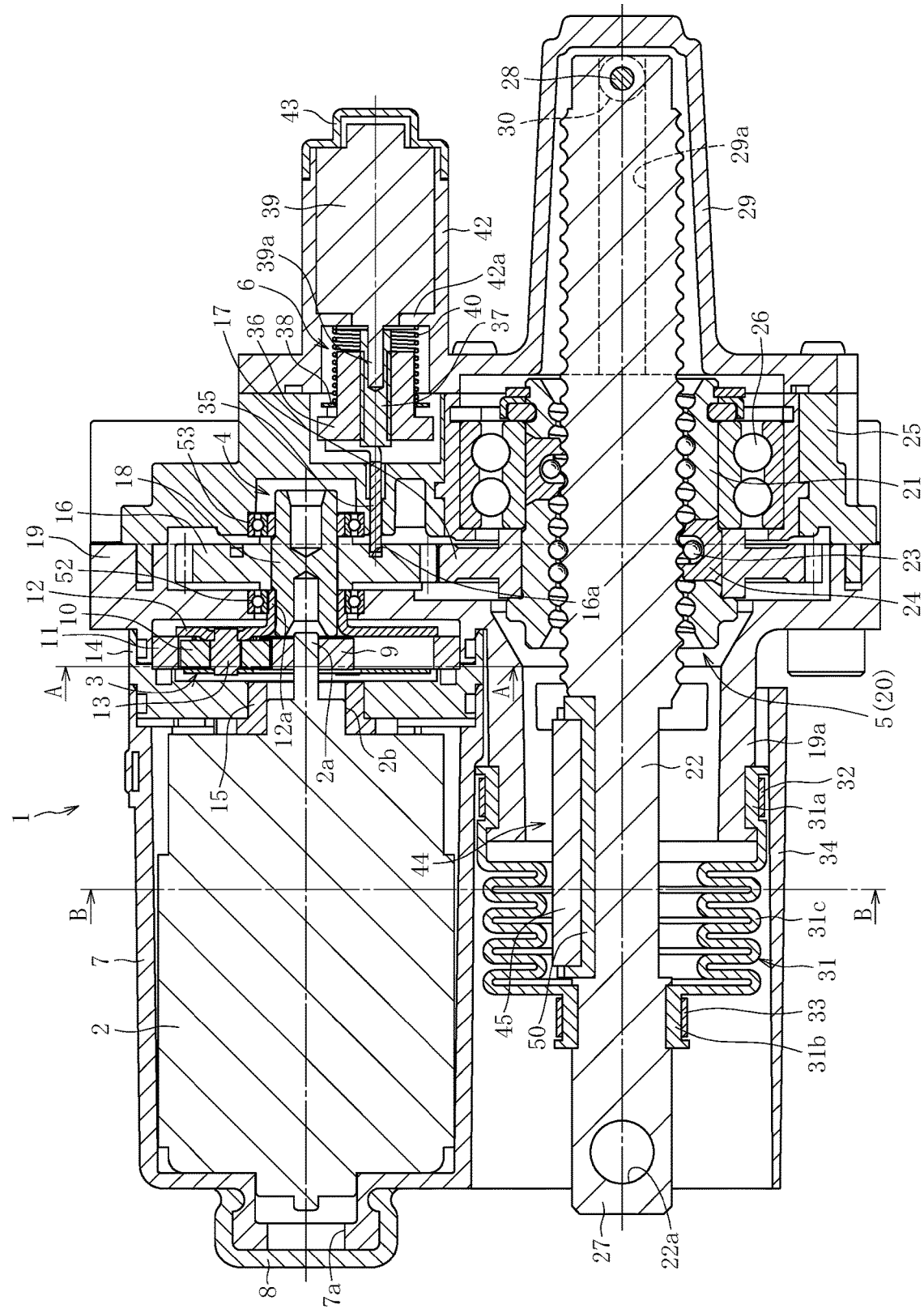
FIG. 1 is a longitudinal sectional view of an electric actuator showing an embodiment of the present invention.

Hereinafter, the present invention will be described with reference to the accompanying drawings. Note that, in each of the drawings for describing the present invention, constituent elements such as members and components having the same function or shape are denoted by the same reference numerals as much as possible, and once described, description thereof is omitted.

Figure 2:
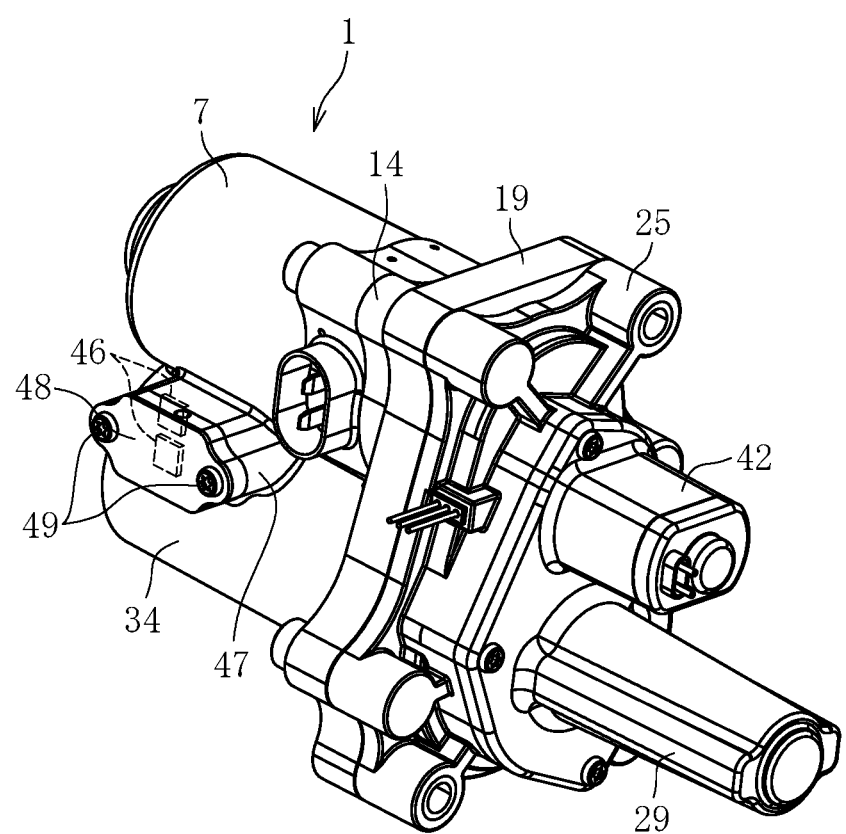
FIG. 2 is an external perspective view of the electric actuator according to the present embodiment.
Figure 3:
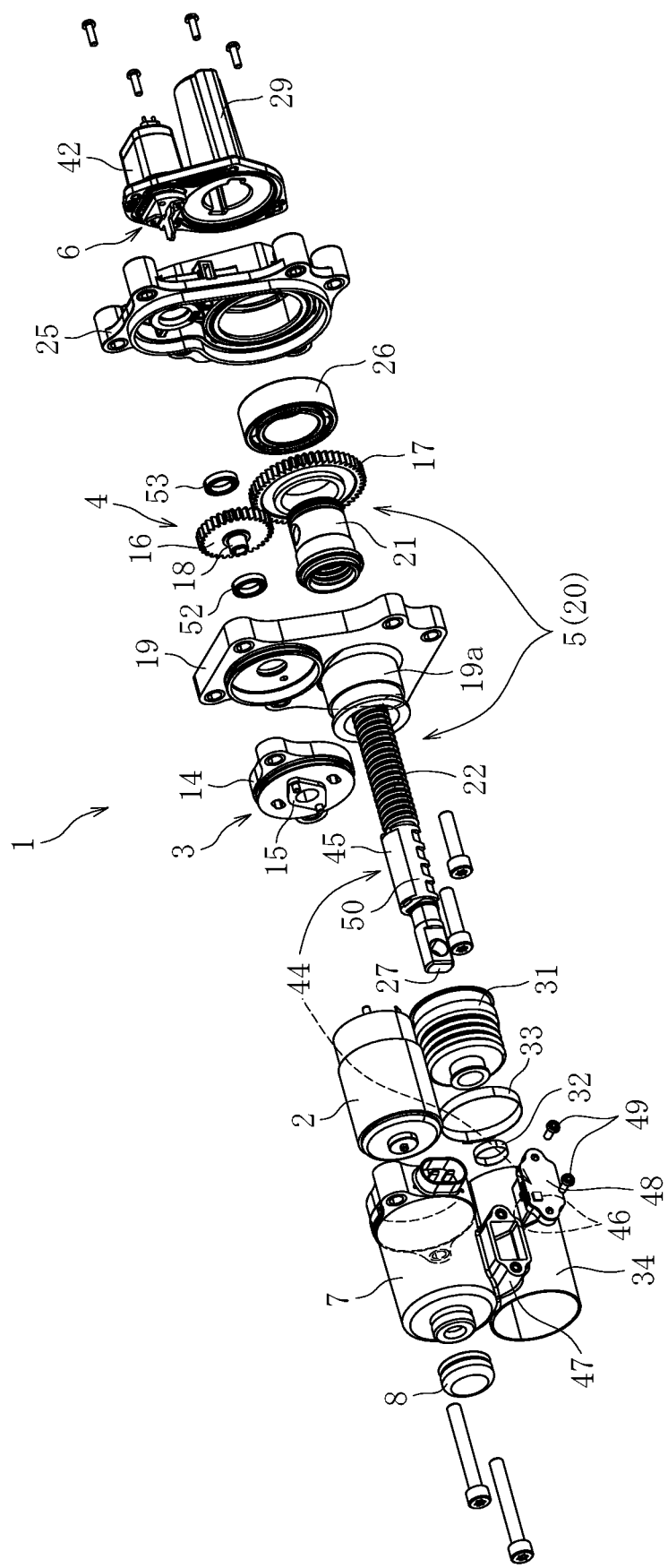
FIG. 3 is an exploded perspective view of the electric actuator according to the present embodiment.
Figure 4:
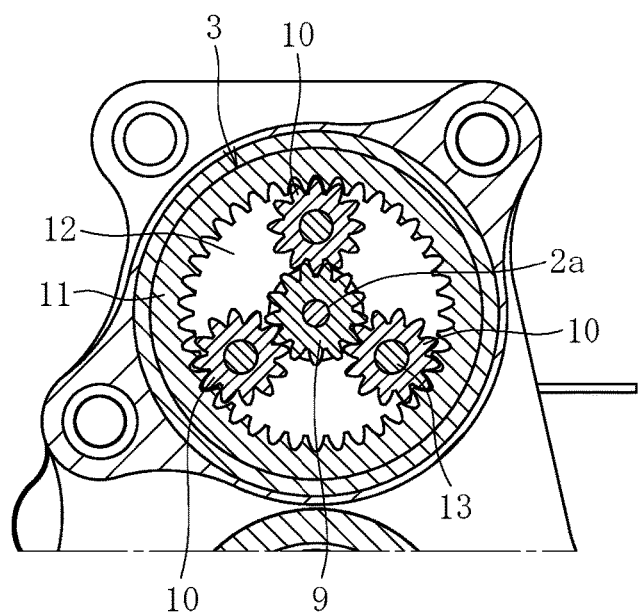
FIG. 4 is a sectional view (a sectional view taken along A-A in FIG. 1) of a speed reduction mechanism included in the electric actuator according to the present embodiment.
Figure 5:
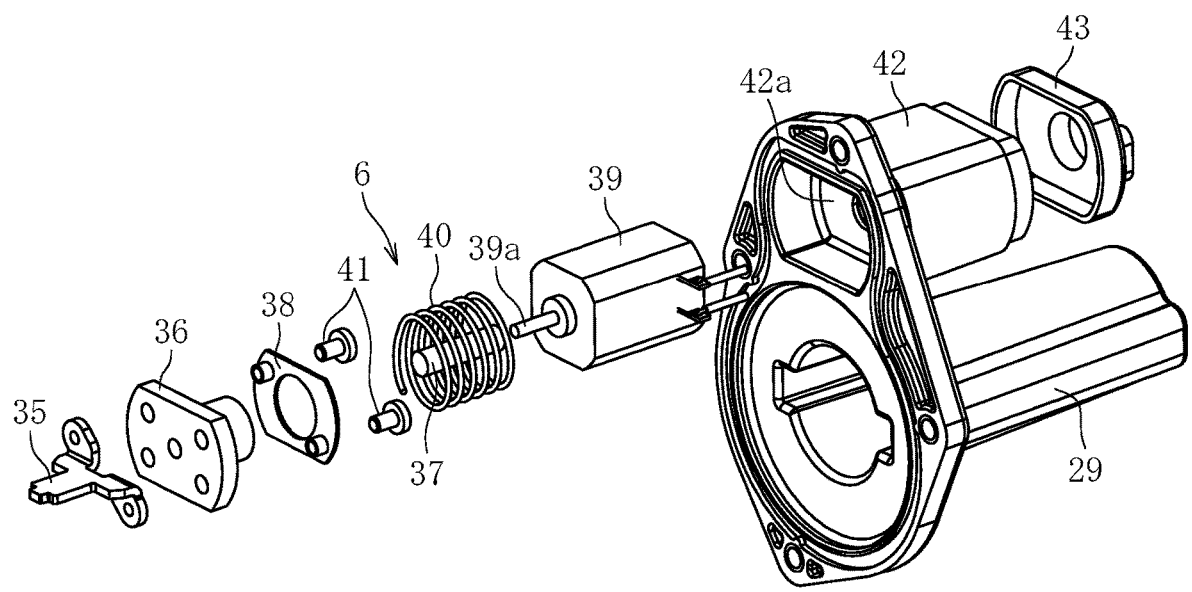
FIG. 5 is an exploded perspective view of a lock mechanism included in the electric actuator according to the present embodiment.

FIG. 1 is a longitudinal sectional view of an electric actuator showing an embodiment of the present invention, FIG. 2 is an external perspective view of the electric actuator according to the present embodiment, and FIG. 3 is an exploded perspective view of the electric actuator according to the present embodiment. Further, FIG. 4 is a sectional view (a sectional view taken along A-A in FIG. 1) of a speed reduction mechanism included in the electric actuator according to the present embodiment, and FIG. 5 is an exploded perspective view of a lock mechanism included in the electric actuator according to the present embodiment.

As shown in FIG. 1, an electric actuator 1 of the present embodiment mainly includes an electric motor 2 as a drive source, a speed reduction mechanism 3 for decelerating rotation of the electric motor 2, a driving force transmission mechanism 4 for transmitting driving force decelerated by the speed reduction mechanism 3, a motion conversion mechanism 5 for converting rotary motion of the electric motor 2 transmitted by the driving force transmission mechanism 4 into linear motion, and a lock mechanism 6 for preventing the electric actuator 1 from being driven.

The electric motor 2 is housed in a motor case 7. The motor case 7 is formed in a bottomed cylindrical shape, and a resin sealing member 8 for sealing a hole 7a is provided at a bottom thereof.

The speed reduction mechanism 3 is a planetary gear speed reduction mechanism including a sun gear 9 connected to a rotating shaft 2a of the electric motor 2, a plurality of planetary gears 10 arranged around the sun gear 9, and the like.

As shown in FIG. 4, the speed reduction mechanism 3 includes the sun gear 9 as an input rotating body, a ring gear 11 as a raceway ring arranged on an outer periphery of the sun gear 9, the plurality of planetary gears 10 rotatably arranged between the sun gear 9 and the ring gear 11, and a carrier 12 as an output rotating body holding the planetary gears 10.

The sun gear 9 is fixed to the rotating shaft 2a of the electric motor 2, and rotates integrally with the electric motor 2. Each planetary gear 10 is arranged between the sun gear 9 and the ring gear 11, and is assembled so as to mesh with them. Further, each planetary gear 10 is rotatably supported by a support shaft 13 provided on the carrier 12.

When the electric motor 2 starts driving, the sun gear 9 of the speed reduction mechanism 3 rotates integrally therewith, and accordingly, the plurality of planetary gears 10 revolves along the ring gear 11 while rotating. Moreover, when the carrier 12 rotates with the revolution of the planetary gears 10, rotation of the electric motor 2 is decelerated and output.

Further, as shown in FIGS. 1 and 3, the speed reduction mechanism 3 is housed in a speed reduction mechanism case 14 connected to the motor case 7. A cylindrical motor adapter 15 as a motor support member for supporting the electric motor 2 is attached to the speed reduction mechanism case 14. The electric motor 2 is supported by inserting a projection 2b on an output side (a right side in FIG. 1) thereof into the motor adapter 15. Note that a portion of the electric motor 2 opposite to the output side is supported by an inner peripheral surface of the motor case 7.

As shown in FIGS. 1 and 3, the driving force transmission mechanism 4 includes a driving side drive gear 16 to which driving force output from the speed reduction mechanism 3 is input and a driven side driven gear 17 that meshes with the drive gear 16. In the present embodiment, the driven gear 17 is constituted by a large-diameter gear having a larger number of teeth than the drive gear 16, and rotation is transmitted from the drive gear 16 to the driven gear 17 by decelerating the rotation. However, these gears 16, 17 may have the same number of teeth, and the rotation may be transmitted at a constant speed. In the center of the drive gear 16, a gear boss 18 is press-fitted and fixed. A cylinder 12a (see FIG. 1) of the carrier 12 of the speed reduction mechanism 3 is press-fitted into one end side of the gear boss 18 so that the carrier 12 and the drive gear 16 rotate integrally. Thus, rotary motion decelerated by the speed reduction mechanism 3 is transmitted from the carrier 12 to the drive gear 16.

Further, the drive gear 16 and the driven gear 17 are accommodated in a transmission mechanism case 19 connected to the speed reduction mechanism case 14. The transmission mechanism case 19 is provided with a rolling bearing 52 that supports the one end side of the gear boss 18. On the other hand, another end of the gear boss 18 is supported by a rolling bearing 53 provided in a motion conversion mechanism case 25 described later.

The motion conversion mechanism 5 is a ball screw mechanism 20 including a rotatable ball screw nut 21, a ball screw shaft 22 inserted on an inner peripheral side of the ball screw nut 21, a large number of balls 23 arranged between spiral grooves formed on an inner peripheral surface of the ball screw nut 21 and an outer peripheral surface of the ball screw shaft 22, and a circulation member 24 for circulating the balls 23 between the spiral grooves. The ball screw mechanism 20 is supported by the motion conversion mechanism case 25 connected to the transmission mechanism case 19. Specifically, the ball screw nut 21 is rotatably supported by a bearing member 26 provided in the motion conversion mechanism case 25. In the present embodiment, the bearing member 26 is a double row angular contact ball bearing, but may be another bearing member. Also, the driven gear 17 is integrally fixed to an outer peripheral surface of the ball screw nut 21.

Therefore, when driving force of the electric motor 2 is transmitted from the drive gear 16 to the driven gear 17 via the speed reduction mechanism 3, the driven gear 17 rotates, and the ball screw nut 21 also rotates integrally therewith. Then, when the ball screw nut 21 rotates, the large number of balls 23 circulate and move along both the spiral grooves, and the ball screw shaft 22 linearly moves in an axial direction thereof, whereby rotary motion of the electric motor 2 is converted into linear motion. Further, when the electric motor 2 rotates in a forward or reverse direction, the ball screw nut 21 rotates in the forward or reverse direction, and the ball screw shaft 22 moves forward or backward in the axial direction. Note that FIG. 1 shows a state in which the ball screw shaft 22 is arranged at an initial position where the ball screw shaft 22 is retreated most to the right in the drawing.

In addition, a tip (a left end in FIG. 1) of the ball screw shaft 22 functions as an operation part 27 that operates a device to be used (not shown) as an operation target. In the present embodiment, a hole 22a for inserting a bolt or a pin for connecting a corresponding part of the device to be used (not shown) to the ball screw shaft 22 is provided on a tip side of the ball screw shaft 22. On the other hand, on a rear end side of the ball screw shaft 22, a rotation preventing pin 28 as a rotation restricting member for restricting rotation of the ball screw shaft 22 is provided. Further, the rear end side of the ball screw shaft 22 is covered with a screw shaft case 29 connected to the motion conversion mechanism case 25. A guide groove 29a extending in the axial direction is formed on an inner peripheral surface of the screw shaft case 29, and the rotation preventing pin 28 and a guide roller 30 provided on the rotation preventing pin 28 are inserted into the guide groove 29a. As the guide roller 30 moves while rotating along the guide groove 29a, the ball screw shaft 22 moves forward or backward in the axial direction without rotating in a circumferential direction.

Further, a boot 31 for preventing foreign matter from entering the ball screw mechanism 20 or the electric actuator 1 is attached to the tip side of the ball screw shaft 22. The boot 31 is made of resin or rubber, and includes a large-diameter end 31a, a small-diameter end 31b, and a bellows 31c that connects them to expand and contract in the axial direction. The large-diameter end 31a is fastened and fixed to an outer peripheral surface of a cylinder 19a provided in the transmission mechanism case 19 by a boot band 32, and the small-diameter end 31b is fastened and fixed to the outer peripheral surface of the ball screw shaft 22 by a boot band 33. Further, a boot cover 34 for protecting the outside of the boot 31 is provided integrally with the motor case 7.

As shown in FIG. 5, the lock mechanism 6 mainly includes a lock member 35, a slide screw nut 36, a slide screw shaft 37, a lock member fixing plate 38, a lock motor 39 as a lock drive source, and a spring 40. The lock member 35 is fastened to the slide screw nut 36 by bolts 41 via the lock member fixing plate 38. The lock motor 39 is housed in a holder 42 provided in the screw shaft case 29. Specifically, the lock motor 39 is inserted into the holder 42 from a side of the holder 42 where a cap member 43 is mounted (a right side of the holder 42 in FIG. 5), and the cap member 43 is mounted on the holder 42. As a result, the lock motor 39 is housed in the holder 42. When the lock motor 39 is housed in the holder 42, a rotating shaft 39a of the lock motor 39 protrudes from a bottom 42a of the holder 42 (a portion opposite to the cap member 43 side) (see FIG. 1), and the slide screw shaft 37 is attached to the rotating shaft 39a.

Further, the spring 40 is disposed on an outer periphery of the slide screw shaft 37, and the slide screw nut 36 is screwed and mounted thereon.

As shown in FIG. 1, the spring 40 is axially compressed between the bottom 42a of the holder 42 and the lock member fixing plate 38. By urging force of the compressed spring 40, the lock member 35 is constantly urged in a forward direction (a left side in FIG. 1). The drive gear 16 is disposed in the forward direction of the lock member 35, and the drive gear 16 has an engagement hole 16a into which a tip of the lock member 35 can be inserted and engaged. Further, a plurality of the engagement holes 16a is provided in a circumferential direction of the drive gear 16. The lock member 35 is engaged with any one of the engagement holes 16a, thereby achieving a locked state in which rotation of the drive gear 16 is regulated and the forward and backward movement of the ball screw shaft 22 is regulated.

FIG. 1 shows a locked state in which the tip of the lock member 35 is engaged with the engagement hole 16a of the drive gear 16. In this state, when power is supplied to the lock motor 39 and the lock motor 39 is driven, the slide screw shaft 37 rotates, so that the slide screw nut 36 and the lock member 35 attached thereto move backward. As a result, the tip of the lock member 35 is disengaged from the engagement hole 16a of the drive gear 16, and the locked state is released. When the locked state is released, the electric motor 2 is driven, and the operation part 27 (the ball screw shaft 22) is moved forward or backward, so that the operation target can be operated. In addition, while the electric motor 2 is driven, energization of the lock motor 39 is continued, and the unlocked state is maintained.

Thereafter, when power supply to the electric motor 2 is cut off and the forward or backward movement of the operation part 27 (the ball screw shaft 22) is stopped, the power supply to the lock motor 39 is also cut off at the same time, and the lock member 35 is pushed and moved in the forward direction by the urging force of the spring 40. As a result, the tip of the lock member 35 engages with the engagement hole 16a of the drive gear 16, and a locked state is established. As described above, since the forward and backward movement of the operation part 27 (the ball screw shaft 22) is restricted by being in the locked state, even when external force is input from the operation target side to the operation part 27 (the ball screw shaft 22) side, it is possible to prevent the operation part 27 (the ball screw shaft 22) from moving in the axial direction and to keep the operation part 27 at a predetermined position.

Further, the electric actuator 1 according to the present embodiment includes a position detection device 44 for detecting an axial position of the operation part 27 (the ball screw shaft 22). The position detection device 44 includes a permanent magnet 45 as a sensor target provided on the ball screw shaft 22 (see FIG. 1) and magnetic sensors 46 as non-contact sensors housed in a sensor case 47 between the motor case 7 and the boot cover 34 (see FIG. 2).

As the magnetic sensor 46, any type can be applied, and among them, a magnetic sensor such as a Hall IC or a linear Hall IC that can detect a direction and magnitude of a magnetic field using Hall effect is preferable. The magnetic sensors 46 are attached to a sensor base 48, and are housed in the sensor case 47 by fastening and fixing the sensor base 48 to the sensor case 47 with bolts 49.

Figure 6:
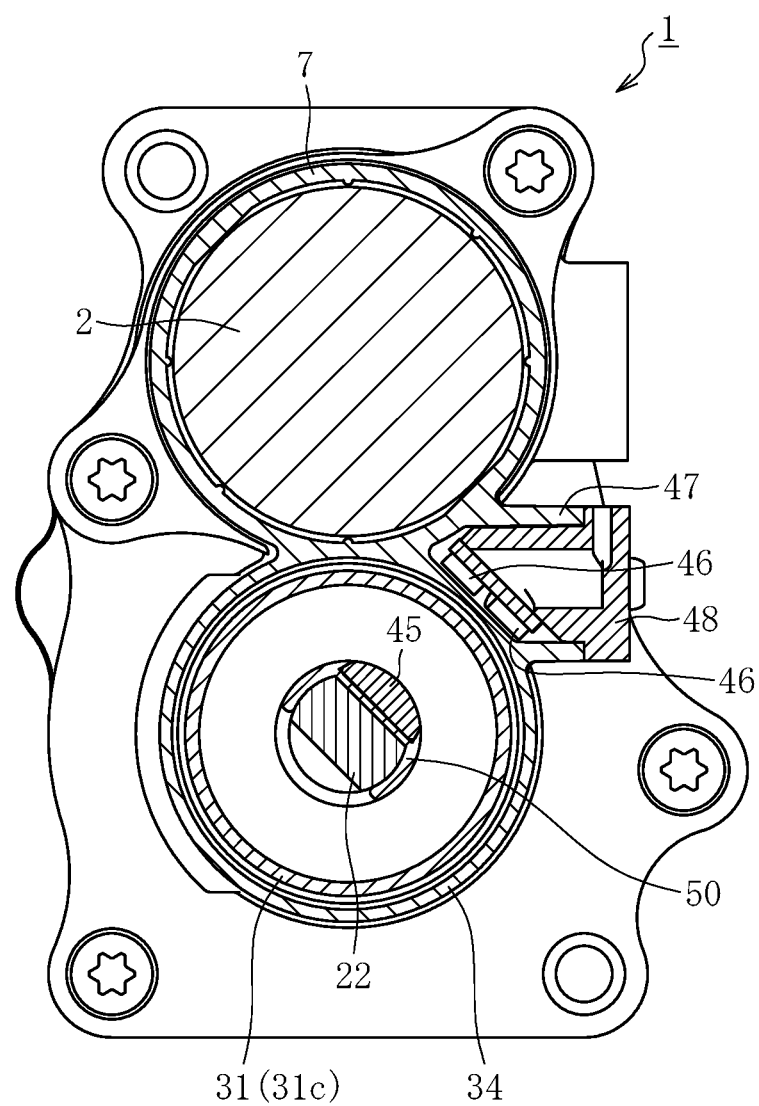
FIG. 6 is a sectional view (a sectional view taken along a line B-B in FIG. 1) of the electric actuator according to the present embodiment, which is cut at positions of magnetic sensors and a permanent magnet.

As shown in FIG. 6, which is a sectional view (a sectional view taken along a line B-B in FIG. 1) of the electric actuator 1 according to the present embodiment cut at positions of the magnetic sensors 46 and the permanent magnet 45, when the magnetic sensors 46 are housed in the sensor case 47 and the permanent magnet 45 is mounted on the ball screw shaft 22, the magnetic sensors 46 face the permanent magnet 45 via the boot 31 and the boot cover 34. Note that the sensor base 48, the sensor case 47, and the boot cover 34 that cover peripheries of the magnetic sensors 46 are preferably formed of nonmagnetic material such as resin.

In the position detection device 44 configured as described above, when the ball screw shaft 22 moves forward and backward, as the position of the permanent magnet 45 with respect to the magnetic sensors 46 changes, a magnetic field at the positions where the magnetic sensors 46 are arranged also changes. By detecting a change in the magnetic field (for example, a direction and strength of magnetic flux density) at this time by the magnetic sensors 46, an axial position of the permanent magnet 45 and thus the axial position of the operation part 27 (the ball screw shaft 22) can be obtained.

Figure 7:
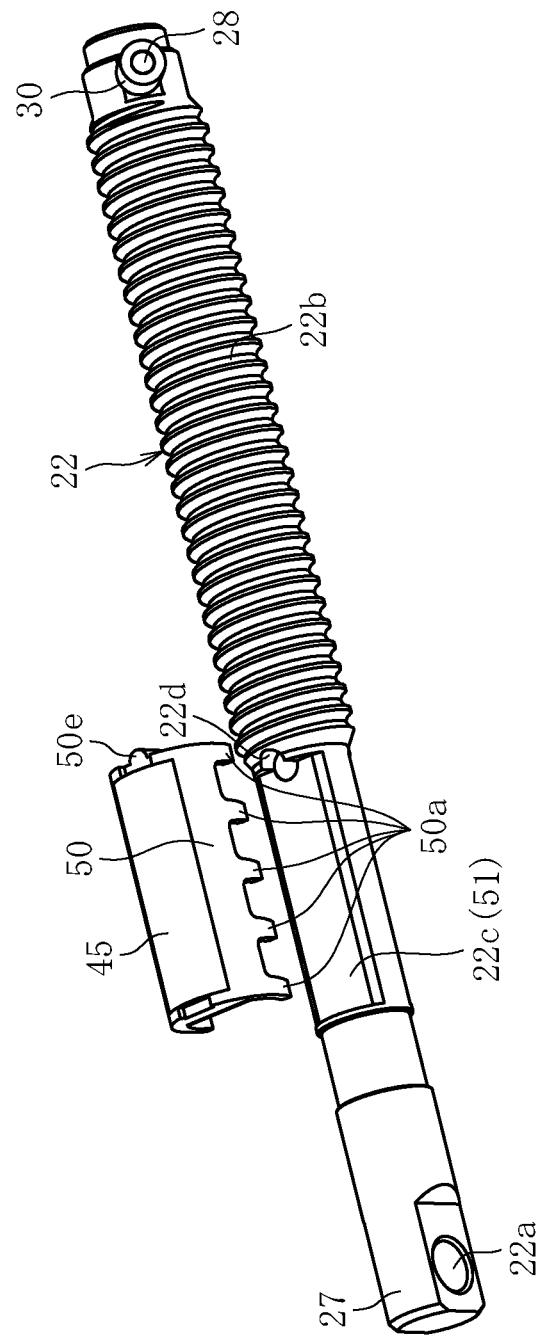
FIG. 7 is a perspective view showing a state before a target holder is attached to a ball screw shaft.
Figure 8:
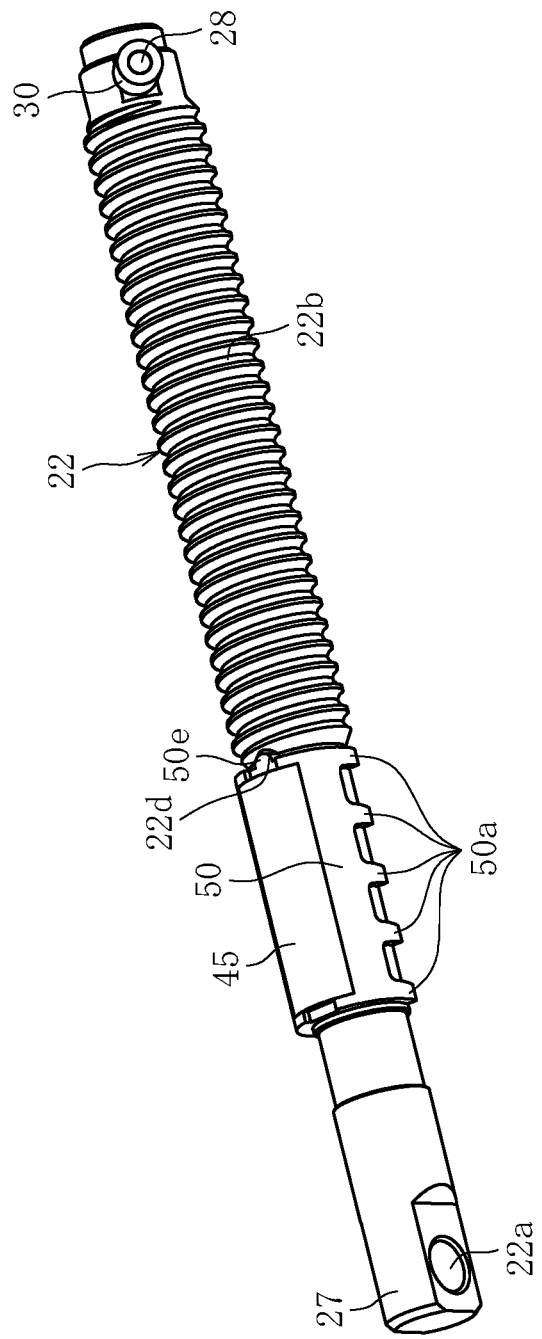
FIG. 8 is a perspective view showing a state where the target holder is attached to the ball screw shaft.

Further, as shown in FIGS. 7 and 8, the permanent magnet 45 is attached to the ball screw shaft 22 via an elastically deformable semi-cylindrical target holder 50. FIG. 7 shows a state before the target holder 50 is attached to the ball screw shaft 22, and FIG. 8 shows a state where the target holder 50 is attached to the ball screw shaft 22.

As shown in FIGS. 7 and 8, the target holder 50 has one or more pairs (five pairs in an illustrated example) of fitting claws 50a. Each fitting claw 50a has a shape following the outer peripheral surface of the ball screw shaft 22, and when the target holder 50 is pushed into the ball screw shaft 22, each fitting claw 50a is elastically deformed in a direction away from each other and thereafter elastically returned. Accordingly, the target holder 50 is attached to the ball screw shaft 22.

Figure 9:
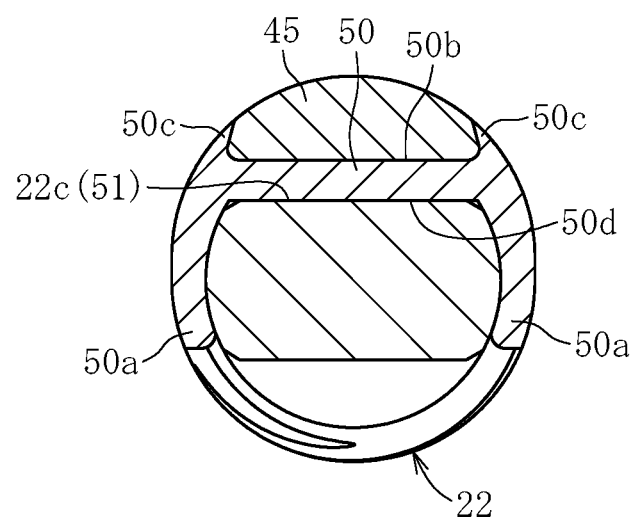
FIG. 9 is a sectional view of the state where the target holder is attached to the ball screw shaft.

FIG. 9 is a sectional view of the state where the target holder 50 is attached to the ball screw shaft 22.

As shown in FIG. 9, on an outer peripheral surface of the target holder 50, a fitting recess 50b into which the permanent magnet 45 can be fitted is provided. The fitting recess 50b has a pair of side walls 50c, and the side walls 50c are formed so as to approach each other toward tip sides thereof. As a result, when the permanent magnet 45 is pushed and fitted into the fitting recess 50b, the permanent magnet 45 is sandwiched between the pair of side walls 50c, thereby preventing the permanent magnet 45 from being detached from the fitting recess 50b.

Also, as shown in FIG. 7, on an outer peripheral surface between a screw 22b and the operation part 27 of the ball screw shaft 22, a mounting surface 22c for mounting the permanent magnet 45 (via the target holder 50) is provided. The mounting surface 22c is formed by a flat surface 51 recessed in a radial direction from the outer peripheral surface of the ball screw shaft 22, and is arranged in parallel with an axis of the ball screw shaft 22. As described above, since the mounting surface 22c is formed by recessing the outer peripheral surface of the ball screw shaft 22, it is possible to reduce an amount of radial projection when the permanent magnet 45 is mounted via the target holder 50. Therefore, a size of the electric actuator 1 can be suppressed. Further, since the mounting surface 22c is the flat surface 51, when the target holder 50 is mounted on the ball screw shaft 22, a flat surface 50d inside the target holder 50 comes into contact with the flat surface 51 of the ball screw shaft 22 (see FIG. 9), thereby restricting rotation of the target holder 50 in the circumferential direction with respect to the ball screw shaft 22.

The permanent magnet 45 is magnetized such that one of both ends in a longitudinal direction is an S pole and another is an N pole. If arrangement of the S pole and the N pole with respect to the ball screw shaft 22 differs for each electric actuator, an output signal of the magnetic sensors 46 that detect a magnetic field thereof changes, so that it is desirable that the S pole and the N pole are arranged in fixed directions. Therefore, in the present embodiment, in order to prevent erroneous assembly of the target holder 50 with respect to the mounting surface 22c, as shown in FIG. 7, a recess 22d and a protrusion 50e for preventing erroneous assembly are provided at an axial one end of the mounting surface 22c and an axial one end of the target holder 50. In other words, when the target holder 50 is in a direction shown in FIG. 7, as shown in FIG. 8, the target holder 50 can be mounted on the mounting surface 22c by fitting the protrusion 50e and the recess 22d. However, when the target holder 50 is in a direction opposite to the direction shown in FIG. 7, the protrusion 50e interferes with an edge of the mounting surface 22c, so that the mounting of the target holder 50 on the mounting surface 22c is hindered. In this way, by enabling mounting only when the target holder 50 is in the predetermined direction with respect to the mounting surface 22c, erroneous assembly in which the permanent magnet 45 is mounted in the direction opposite to the predetermined direction can be prevented. Note that, contrary to the present embodiment, the protrusion may be provided on the mounting surface 22c, and the recess may be provided on the target holder 50.

Figure 10:
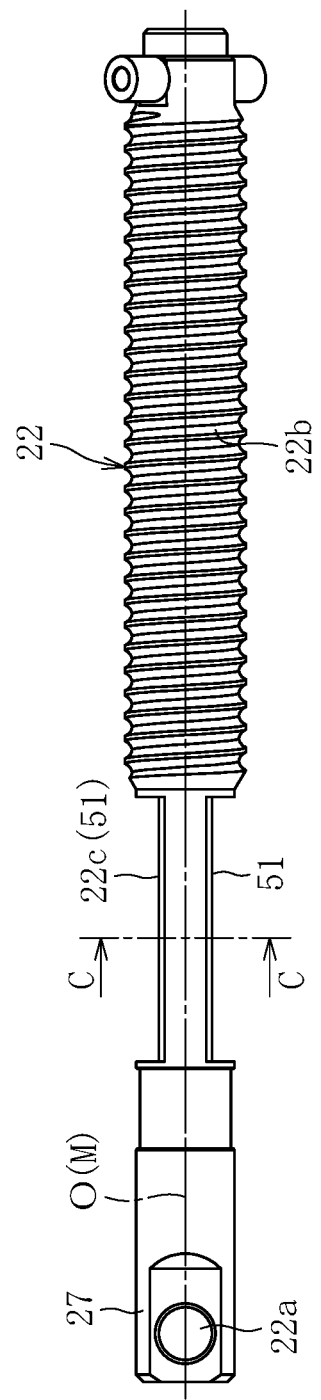
FIG. 10 is a side view of the ball screw shaft according to the present embodiment.
Figure 11:
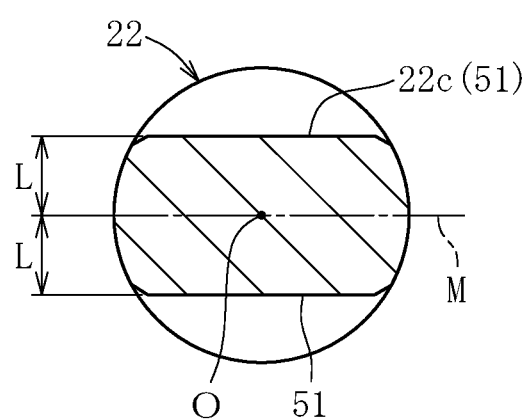
FIG. 11 is a sectional view (a sectional view taken along C-C of FIG. 10) of the ball screw shaft according to the present embodiment.
Figure 12:
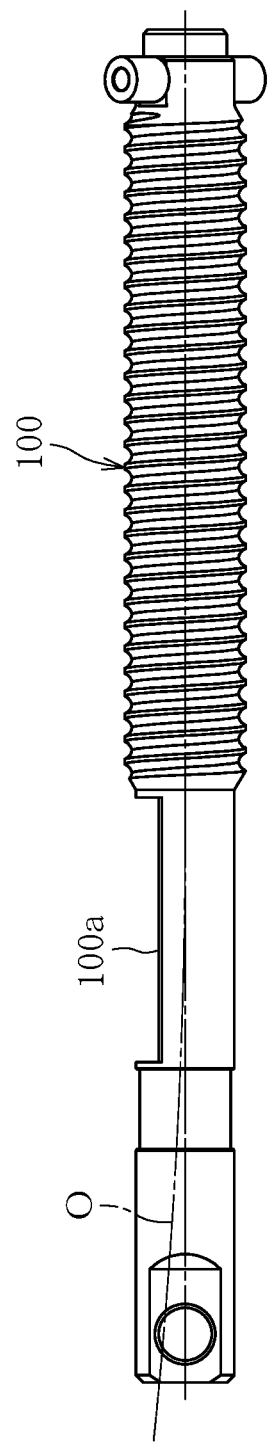
FIG. 12 is a view for explaining problems in a conventional screw shaft.

Here, as shown in FIG. 10 and FIG. 11, which is a sectional view taken along C-C of FIG. 10, the ball screw shaft 22 according to the present embodiment is different from the conventional screw shaft shown in FIG. 12, and the flat surface 51 similar to the mounting surface 22c is also formed on a circumferential opposite side of the mounting surface 22c. These two flat surfaces 51 are formed at the same distance L from a symmetry axis M passing through an axis O of the ball screw shaft 22 (see FIG. 11), and are formed line-symmetric with each other with respect to the axis O (the symmetry axis M). In other words, since the two flat surfaces 51 that are line-symmetric with each other are provided, a portion where the mounting surface 22c of the ball screw shaft 22 is formed has a non-circular, line-symmetric cross section. Note that the distance L from the symmetry axis M to each flat surface 51 includes not only the completely same distance but also a case where there is an allowable design error of about 1 mm (substantially the same). Further, the cross section of the portion where the mounting surface 22c of the ball screw shaft 22 is formed may be a quadrangular cross section or a cross section of a polygon such as a regular octagon.

As described above, in the ball screw shaft 22 according to the present embodiment, since the portion where the mounting surface 22c is formed has a line-symmetric cross section having the two flat surfaces 51, even if this portion is formed by cutting processing, a warp of the ball screw shaft 22 due to the processing can be suppressed. In other words, in forming the two flat surfaces 51 by cutting a circular cross section of the ball screw shaft 22, even if a warp occurs due to cutting resistance or heat during the processing, warps that occur on the one flat surface 51 side and the other flat surface 51 occur to the same extent in directions opposite to each other. For this reason, the warps that occur on the one flat surface 51 side and the other flat surface 51 side are offset each other, and a warp that finally occurs on the ball screw shaft 22 can be suppressed. As a result, linearity (straightness) of the ball screw shaft 22 can be improved, and occurrence of misalignment between the ball screw shaft 22 and the ball screw nut 21 due to the warp can be suppressed. As a result, it is possible to avoid a malfunction, reduction in operation efficiency, and reduction in a life of the ball screw mechanism. The highly reliable ball screw mechanism and electric actuator can be provided.

Further, in the ball screw shaft 22 according to the present embodiment, since the cross-sectional shape is line-symmetric, it is possible to suppress occurrence of a warp due to heat treatment. In other words, since the cross-sectional shape is line-symmetric, an amount of shrinkage of the ball screw shaft 22 due to the heat treatment becomes uniform, so that occurrence of a warp due to a difference in amount of shrinkage can be suppressed. As a result, even if heat treatment such as induction hardening or vacuum carburizing is performed on at least the portion where the mounting surface 22*c* is formed in order to improve strength, occurrence of a warp is suppressed. Therefore, it is possible to provide the ball screw shaft 22 having high shaft linearity (straightness) while securing required strength.

Further, since the ball screw shaft 22 according to the present embodiment has the two flat surfaces 51, an operator can select one of the flat surfaces 51 to mount the target holder 50, thereby also improving a degree of freedom (flexibility) in mounting. In addition, by providing the above-described recess or protrusion for preventing erroneous assembly on both the flat surfaces 51, it is possible to prevent erroneous assembly in attaching the target holder 50 to either of the flat surfaces 51.

The embodiment of the present invention has been described above, but the present invention is not limited to the above-described embodiment. It is needless to say that the present invention can be embodied in various forms without departing from the gist of the present invention.

In the above-described embodiment, the mounting surface 22*c* to which the target holder 50 is mounted is formed by the one flat surface 51, but the mounting surface 22*c* may be a surface obtained by combining a plurality of flat surfaces or curved surfaces. Even with such a mounting surface 22*c*, it is possible to suppress occurrence of a warp of the ball screw shaft 22 by forming the surfaces so as to be line-symmetric with each other.

Further, in the above-described embodiment, an example in which the present invention is applied to the ball screw shaft 22 has been described. However, the feed screw mechanism according to the present invention is not limited to the ball screw mechanism, and may be a slide screw mechanism in which a screw shaft is screwed to a nut without using a ball.

Further, the electric actuator according to the present invention is not limited to the electric motor according to the above-described embodiment which converts the rotary motion of the electric motor into the linear motion parallel to the rotation axis thereof, but may be an electric motor which converts the rotary motion of the electric motor into linear motion coaxial to the rotation axis thereof.

REFERENCE SIGNS LIST

1 electric actuator
2 electric motor
20 ball screw mechanism
21 ball screw nut
22 ball screw shaft
22*c* mounting surface
22*d* recess
44 position detection device
45 permanent magnet
46 magnetic sensor
50 target holder
50*e* protrusion
51 flat surface
O axis

The invention claimed is:

1. A screw shaft for a feed screw mechanism provided in an electric actuator, the screw shaft comprising:
   two flat surfaces that are parallel to each other and symmetrical with respect to a plane containing a central axis of the screw shaft, the two flat surfaces facing away from each other in opposite directions,
   wherein one of the two flat surfaces is a mounting surface for mounting a sensor target.

2. The screw shaft according to claim 1, wherein the flat surface serving as the mounting surface can be arbitrarily selected from the two flat surfaces.

3. The screw shaft according to claim 1, wherein
   the mounting surface is a surface on which a target holder that holds the sensor target is mounted, and
   a protrusion or a recess for preventing erroneous assembly of the target holder with respect to the mounting surface is provided at an axial one end of the mounting surface.

4. The screw shaft according to claim 1, wherein at least a portion of the screw shaft where the mounting surface is formed is heat-treated.

5. A feed screw mechanism provided in an electric actuator, the feed screw mechanism comprising:
   a rotatable nut; and
   a screw shaft that moves in an axial direction with rotation of the rotatable nut,
   wherein the screw shaft according to claim 1 is used as the screw shaft.

6. An electric actuator comprising:
   an electric motor; and
   a feed screw mechanism that converts rotary motion of the electric motor into linear motion,
   wherein the screw shaft according to claim 1 is used as a screw shaft constituting the feed screw mechanism.

* * * * *